April 21, 1964     B. Q. BERTRAM     3,129,640
AUTOMATIC COPYING MACHINES

Filed March 6, 1961     3 Sheets-Sheet 1

INVENTOR.
BENJAMIN Q. BERTRAM
BY
ATTORNEY

April 21, 1964 B. Q. BERTRAM 3,129,640
AUTOMATIC COPYING MACHINES
Filed March 6, 1961 3 Sheets-Sheet 2

INVENTOR.
BENJAMIN Q. BERTRAM
BY
*Robert J. Haase*
ATTORNEY

April 21, 1964     B. Q. BERTRAM     3,129,640
AUTOMATIC COPYING MACHINES

Filed March 6, 1961     3 Sheets-Sheet 3

INVENTOR.
BENJAMIN Q. BERTRAM
BY
Robert J. Haase
ATTORNEY

United States Patent Office 3,129,640
Patented Apr. 21, 1964

3,129,640
AUTOMATIC COPYING MACHINES
Benjamin Quesenbury Bertram, Ashford, England, assignor to The Sperry Gyroscope Company Limited, Brentford, England, a company of Great Britain
Filed Mar. 6, 1961, Ser. No. 93,670
Claims priority, application Great Britain Mar. 10, 1960
4 Claims. (Cl. 90—13)

This invention relates to automatic copying machines of the kind in which a tool is arranged to be moved relative to a workpiece synchronously with the movements of the probe relative to a template, and seeks to provide an improved form thereof.

In accordance with the invention there is provided an automatic copying machine comprising a probe movable along two paths one transversely of the other and biassed in one direction along one of said paths, said probe being arranged to be mechanically linked to an auxiliary template by which the direction in which the probe is biassed is controlled approximately to maintain a predetermined angle to the local tangent of the surface of the template at the point where the probe contacts it.

Figure 1A:
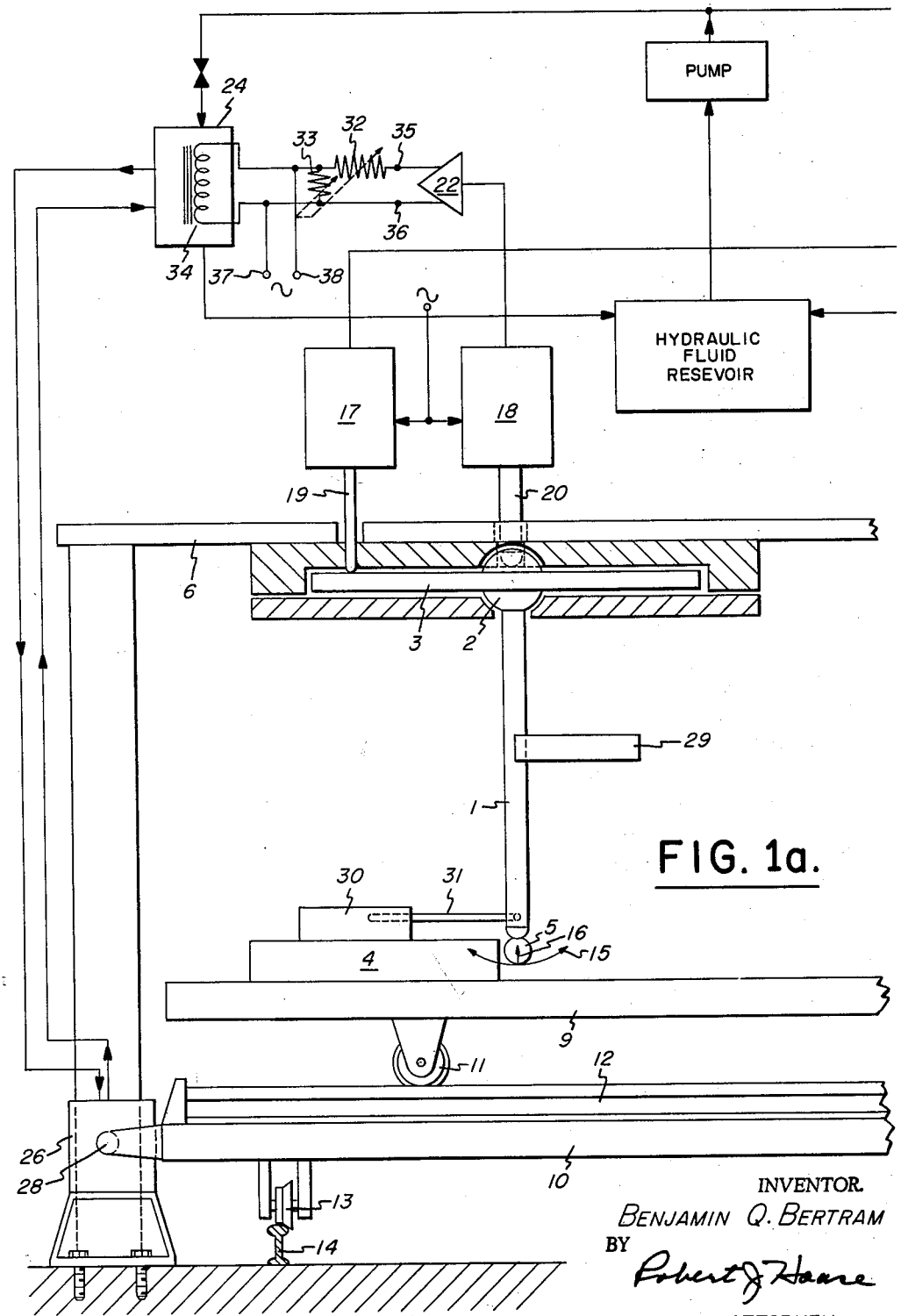
Figure 1B:
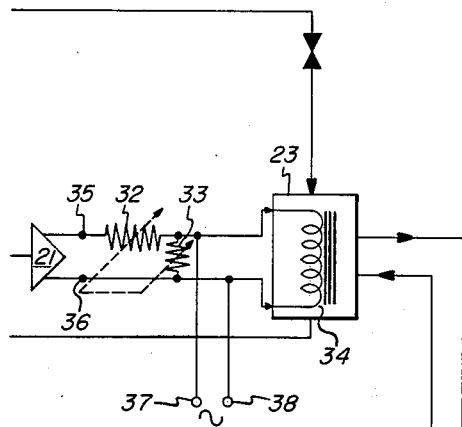
Figure 1B:
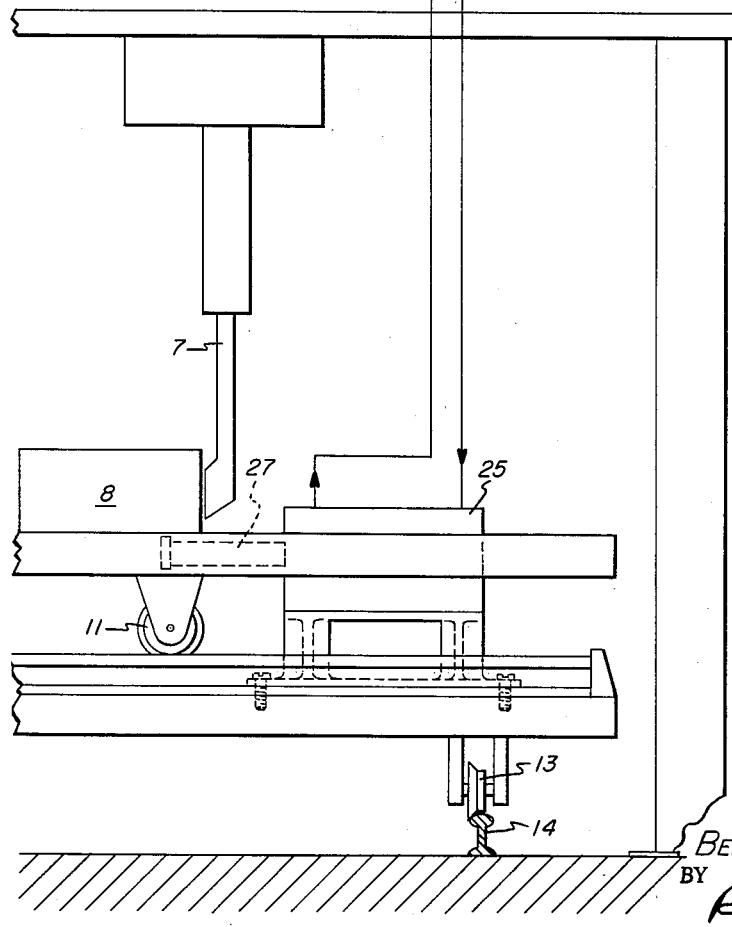
Figure 2:
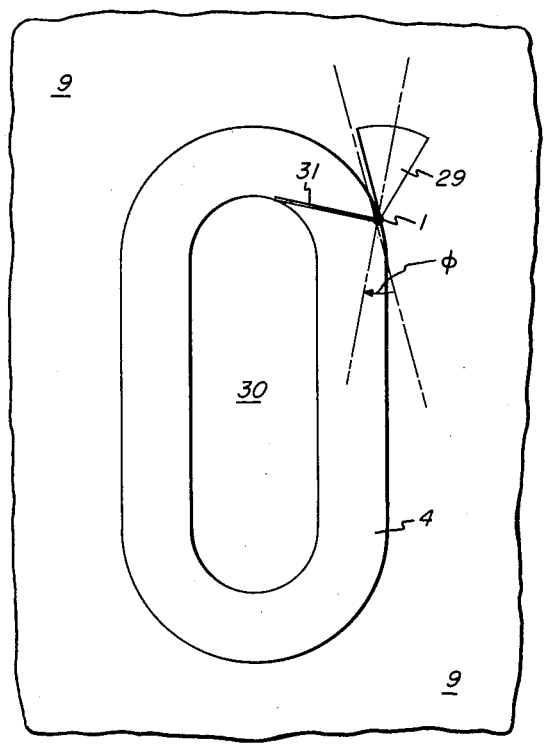

In order that the invention may be more readily understood one particular embodiment thereof will now be described, by way of example only, with reference to the accompanying drawings in which:

FIGURE 1 is a schematic diagram of part of an automatic copying machine in accordance with the present invention, and FIGURE 2 is a plan view of part of the machine shown in FIGURE 1.

As will be seen from the drawings, the machine has a probe formed by a rod 1 supported at its upper end by a universal ball mounting 2 having an equatorially extending plate 3 and presenting at or near its other end a portion adapted to engage the edge of a template 4 and formed as a part spherical portion 5. The plate 3 is universally movable over a limited range of movement relative to a fixed support member 6 which also carries a tool 7 at another part for performing an operation on a workpiece 8. The fixed support member 6 is supported above the bed of the machine and the template 4 and workpiece 8 are arranged to be moved together relative to said bed. To enable this movement to be effected the template 4 and workpiece 8 are secured to a carriage member 9 which is movable in two mutually perpendicular directions relative to the bed of the machine. The carriage member 9 is mounted for movement in one of these directions on an auxiliary carriage member 10 by means of wheels 11 and guide rails 12. The movement of the carriage member 9 in the other of the directions is achieved by mounting the rails 12 on the auxiliary carriage member 10 and then arranging the auxiliary carriage for movement in said other direction by means of wheels 13 and guide rails 14.

Movements of the support plate 3 in response to movements of the spherical portion 5 of the probe along either of the two mutually perpendicular directions 15, 16 is detected by means of two electromagnetic pick-off devices 17, 18. These pick-off devices have their actuating members 19, 20 engaging on the plate 3 and provide electric signals representing the movements of the plate 3 in response to movements of the spherical portion 5 of the probe imparted by the surface of the template 4. These electric signals are amplified by amplifiers 21, 22, the output signals of which control electrohydraulic valves 23, 24 respectively, which in turn control the supply of hydraulic fluid to two hydraulic actuators 25, 26, the output shafts 27, 28 of which respectively move the carriage member 9 relative ot the auxiliary carriage member 10 relative to the bed of the machine to effect movement of the workpiece and template relative to the tool and probe.

In order that the signals from the pick-off devices 17, 18 should have a known meaning relative to the position of the portion 5 of the probe relative to the template, the probe is biassed in one direction along the path 15 by means of the sector-shaped weight 29 mounted on the probe rod 1. This bias determines the direction in which the tool would move relative to the work in the absence of a template, and in operation is maintained at an approximately constant direction relative to the tangent of the surface of the template at the point where the portion 5 engages it to cause the probe to explore the edge of the template and travel along the edge at an approximately constant speed. This approximately constant speed of the probe relative to the template results in the tool cutting the workpiece at a corresponding, approximately constant speed. The direction of the bias is maintained at the desired angle to said tangent by means of a mechanical coupling between the probe rod 1 and the template 4 or, as shown, an auxiliary template 30 fixed relative thereto which effects rotation of the pick-off rod 1 about its longitudinal axis and hence rotation of the direction of bias about the same axis. This mechanical coupling is effected by means of an arm 31 projecting from the probe rod transversely of its longitudinal axis and engaging the auxiliary template 30 which is secured to the template proper 4. The shape of the auxiliary template 30 is generally similar to the template proper and at a reduced scale. However, the shape of the auxiliary template is not identical with that of the template proper since, in practice, its shape has to be determined empirically for each template so that the arm 31 is moved to effect rotation of the probe rod 1 in the appropriate manner to ensure that the direction of biassing maintains the desired angle, as determined by the required cutting speed of the tool on the work, to the local tangent of the edge of the template proper 4 at all points around its circumference. Again, in practice, there is a considerable latitude in the maintenance of this angle at the desired value, since most materials can be cut satisfactorily over a moderate range of speeds, particularly where extreme accuracy is not required. Therefore in many cases the auxiliary template 30 may allow the direction of biassing to vary over an arc as wide as 20° or 25° and, in some cases, even as wide as 30°.

The biassing of the probe for many general applications may be arranged to subtend an acute angle $\phi$ of about 30° to the local tangent of the template in the direction of feed of the probe relative to the template. The slight tilt taken up by the probe under these conditions causes a signal in one or other of the pick-offs 17 or 18 which is effective to produce feeding of the workpiece relative to the tool in the required direction. If required, the auxiliary template can be so shaped that as the probe is moved around the template proper 4, the angle between the direction of bias and the local tangent of the surface of the template proper is deliberately varied to vary the cutting speed of the tool on the workpiece. This feature is particularly advantageous during the commencement and towards the completion of operation of the tool on the workpiece because a smooth run-in and run-out of the tool to the work can be achieved.

In order to prevent the probe ordering the tool to make too rapid a cut on the workpiece, such as could occur with a non-idealised shape of auxiliary template 30, the supply of hydraulic fluid to the actuators 25, 26 may be throttled so that no matter how widely the electrohydraulic valves 23, 24 are opened in response to a signal from the pick-offs 17, 18 associated with the probe, the rate of feed of hydraulic fluid to the actuators is prevented from exceeding the amounts corresponding to the desired maximum feed rate of the tool on the workpiece.

As a further control on cutting speed the output signal of each of the amplifiers 21 and 22 may be applied to its respective electrohydraulic valve 23 or 24 through an attenuator network formed by two adjustable impedances 32, 33, one impedance 32 being connected in series with the energising solenoid 34 of the electrohydraulic valve between the output terminals 35, 36 of the amplifier, and the other impedance 33 being connected in shunt with said energising solenoid 34. The impedance of these impedances 32, 33 is arranged to be adjusted simultaneously so that the natching of the load presented by the attenuator network together with the energising solenoid 34 of each electrohydraulic valve 23, 24 to its associated amplifier is maintained approximately at a constant value irrespective of the attenuation introduced by the network. The impedances of the attenuator network are conveniently formed by resistors. Further, at low cutting speeds we have found that hysterisis effects in the electrohydraulic valves are likely to cause an unacceptable, erratic variation in the feed speed of the tool on the workpiece. The hystersis effect may be overcome by applying, through the terminals 37, 38, to the energising solenoids 34 of the electrohydraulic valves 23, 24 an alternating current signal having a frequency sufficiently high for the very slight variations in finish on the work piece caused by the alternating current signal to have a magnitude sufficiently small to be neglected. In one particular automatic copying machine in accordance with the present invention a frequency of 50 c.p.s. of this alternating current signal was found to produce, in addition to nullifying the hystersis effect, an unacceptable finished surface on the workpiece. However, when the frequency was raised to 100 cycles per second, the hystersis effect was still nullified but the effects of the rapid variation in the feed speed of the actuators 25 and 26 due to the alternating current signal could no longer be detected on the finished surface of the workpiece.

Various modifications may be made to the arm 31 and auxiliary template 30 to enable automatic copying of templates of complex shape. For example the arm 31 may be held against a cam surface corresponding to auxiliary template 30 by means such, for example, as a spring, the arm having a pin or roller at its end projecting into a cam slot in a surface of the cam which is either parallel to the template or normal to it. Two or more of such arms may, if desired, be arranged to engage alternately or in succession in a number of such cam slots in the manner of a Geneva mechanism or pin gearing for performing a work operation on a workpiece in accordance with a complex template, particularly one having re-entrant portions.

The arrangements of the present invention may be applied as a modification to the arrangement described in the co-pending application Serial No. 832,602 filed August 10, 1959, now Patent 3,007,375 issued November 7, 1961. In the arrangement described in that application the direction in which the probe is biassed is maintained, by means of a servo control system, approximately normal to the local tangent of the template at that place at which the probe contacts it. A similar result may be achieved by employing the mechanical coupling arrangements of the present invention. In such an arrangement the direction of drive of the actuators is determined by two order signals derived from a resolver the stator and rotor of which are positioned one relative to the other in accordance with the angular position of the direction of bias of the probe relative to a datum angular position so that the order signals are proportional to the sine and cosine of the angle which the rotor makes with the axis of the resultant field in the stator. In the arrangement of our aforesaid application the resultant field is an approximately constant one produced by an exciting current applied to an exciting winding so that the drive is always in the same direction relative to the probe. In the particular embodiment described in that application this direction is perpendicular to the direction of bias of the probe.

In the present modification the stator of the resolver is provided with two exciting windings having axes electrically at right angles. One, equivalent to that in said application, is normally permanently excited by an exciting current the amplitude of which determines the speed of contour following by the probe and thus of the tool relative to the workpiece. The other winding is excited from a source of correction current. This correction current may be derived from the output terminals of an electric amplifier which has applied to its input terminals a following error signal derived from a pick-off device associated with the probe in accordance with its movements in the direction of bias. In this arrangement the probe may conveniently be mounted to engage the edge of the template and be movable along one path only instead of along two mutually perpendicular paths as in the arrangements described above and in the application referred to above.

In an arrangement such as just described the two magnetic fields produced by the two windings may be considered to correspond respectively to a vector in the direction of the tangent to the template which is defined by the action of the auxiliary template of the present invention and to a correction vector along the normal to the contour. The first field is of constant magnitude when a constant rate of feed of the tool to the workpiece is required, and the second field has a magnitude dependent upon the following error measured by the probe. Therefore, as in the arrangement of the application previously referred to, the resultant direction of action is in a direction turned from the direction of the tangent to the contour by a small correction angle dependent upon following error. In the modified arrangement the direction of the tangent to the contour is determined not by the probe itself but by the edge of the auxiliary template or equivalent member of the present invention. It follows that in the modified arrangement the auxiliary template serves not only to control the orientation of the direction of bias of the probe, but also to determine the main components of the order signals to the actuators, and therefore the resultant direction of drive of the template follower relative to the template and of the tool relative to the work.

Further modifications of the invention are possible which also utilise the auxiliary template or its equivalent not only to turn the direction of bias of the probe as it moves along the edge of the template proper, but also to determine the components of the order signals for the actuators. In these further modifications there is mounted on the probe a displaceable carriage or auxiliary probe, one end of which is mounted on the arm 31, described above, in order to keep the direction of sensitivity of the probe turned towards the template. The carriage or auxiliary probe is mounted on the arm 31 at some distance from the axis of rotation of the probe and may constitute the portion of the arm which engages the auxiliary template. The other end of the carriage or auxiliary probe is guided on the support member 6 so as to be displaceable along the direction of bias of the probe. This other end is held against the edge of the template proper so that it is displaced if the probe intrudes across the contour defined by the template proper. The extent of this displacement is therefore a measure of following error. This modification differs from that referred to above in that the carriage or auxiliary probe is positioned in dependence upon the direction of the tangent to the contour of the template proper by virtue of the fact that one end of the carriage or auxiliary probe contacts the auxiliary template of the present invention. The carriage or auxiliary probe may control the order signals for the actuators in either of the two ways outlined above.

What is claimed is:

1. An automatic copying machine comprising a main template, an auxiliary template, a tiltable probe, means for biasing said probe, said probe contacting said main template and being controlled by said auxiliary template whereby the direction in which said probe is biased relative to the local tangent of the surface of said main template at the point where said probe contacts said main template is determined by said auxiliary template, said probe tilting an amount determined by the direction in which said probe is biased, and means for controlling the cutting speed of said machine in accordance with the amount of tilt of said probe.

2. An automatic copying machine as defined in claim 1 wherein said probe is biased by means of weight eccentrically attached to said probe.

3. An automatic copying machine as defined in claim 1 wherein said probe is arranged to be mechanically linked to said auxiliary template by an arm projecting from said probe approximately transversely of its longitudinal axis and engaging a surface of said auxiliary template.

4. An automatic copying machine as defined in claim 1 wherein said means for controlling the cutting speed of said machine includes plate member for supporting said probe, and means for determining the displacement of said member caused by the tilt of said probe.

References Cited in the file of this patent

UNITED STATES PATENTS

| | | |
|---|---|---|
| 2,412,619 | Kindermann et al. | Dec. 17, 1946 |
| 2,752,827 | Ernst | July 3, 1956 |
| 2,976,778 | Schmid | Mar. 28, 1961 |